R. P. NIELSEN.
MEANS FOR THE PROPULSION OF VESSELS.
APPLICATION FILED AUG. 14, 1909.

957,622.

Patented May 10, 1910.

Witnesses

Inventor
Rasmus Peder Nielsen
By
Attorneys

UNITED STATES PATENT OFFICE.

RASMUS PEDER NIELSEN, OF TRANEBJERG, NEAR SAMSÖ, DENMARK.

MEANS FOR THE PROPULSION OF VESSELS.

957,622. Specification of Letters Patent. Patented May 10, 1910.

Application filed August 14, 1909. Serial No. 512,897.

*To all whom it may concern:*

Be it known that I, RASMUS PEDER NIELSEN, a subject of the King of Denmark, and a resident of Tranebjerg town and parish, near Samsö, Denmark, teacher of domestic economy, have invented new and useful Improvements in Means for the Propulsion of Vessels, of which the following is a specification.

The invention relates to the propulsion of vessels and has for its object to provide a simple, cheap and effective propelling mechanism.

A practical embodiment of the invention is represented in the accompanying drawing forming a part of this specification, in which similar characters of reference indicate corresponding parts in both views.

Figure 1:
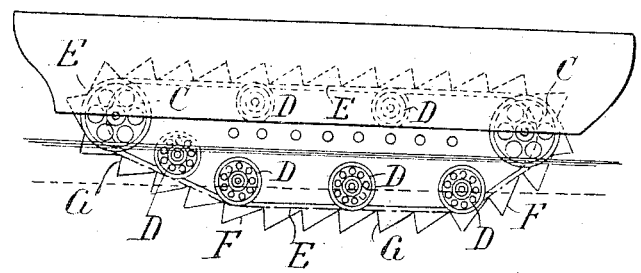
Figure 2:
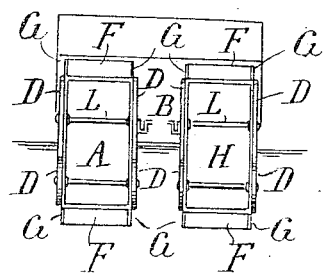
Figure 3:
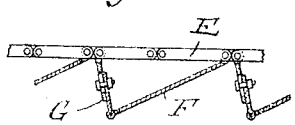

Figure 1 is a side view of the improvement; Fig. 2 is an end view; and Fig. 3 is a detail sectional view of the blades.

As shown in the drawing the vessel is composed of two hulls A and H arranged side by side and connected together by a deck B. Each hull has a flat bottom and upwardly inclined and rounded ends. The hulls can be spaced a greater or less distance apart as desired and the space between the hulls and directly below the deck, is intended to be utilized as a compartment for machinery and by means of which access can be had to the hulls.

In the ends of each hull, shafts L are mounted and upon the ends of each shaft outside of the hulls, sprocket wheels C are secured. One shaft of each hull extends into the space between the said hulls and is provided with means whereby it may be operated. On the sides of each hull a plurality of guide wheels D are mounted, and over these guide wheels and the sprocket wheels C pass endless chains E provided with rollers.

The chains of each hull are provided with a plurality of blades, each of which consists of plates F and G pivoted to each other and to the chains so that the plates F will stand at an inclination as shown. In order to vary the inclination of the plates F, the plates G are formed of two members adjustable one upon the other to permit them to be lengthened or shortened according to the inclination to be given to the said plates.

If desired the wheels D can be dispensed with and guide rails employed instead. In this event the chains will be provided with larger rollers.

It is to be understood that each pair of chains are independently operated, that is to say the chains of the hull A operate independently of the chains of the hull H.

In operation the pairs of chains being set in motion the vessel is propelled and owing to the inclination of the plates F of the blades, they tend to raise the vessel and thereby facilitate its passage through the water.

What I claim and desire to secure by Letters Patent is:

1. The combination with a vessel, of an endless carrier mounted thereon, a plurality of inclined blades on the carrier, and means for adjusting the inclination of said blades.

2. The combination with a vessel, of a pair of endless chains arranged on opposite sides of the hull, and blades secured to the chains, each blade consisting of an inclined plate pivoted to the chains and an adjustable member pivoted to the plate and to the chains.

3. The combination with a vessel having two hulls spaced apart and connected by a deck, of a pair of endless chains for each hull, the pairs of chains being adapted to be independently operated and each provided with a plurality of adjustable blades standing at an inclination to the chains.

4. The combination with a vessel having two hulls arranged side by side and connected together by a deck, of a pair of endless chains for each hull, the pairs of chains being adapted to be independently operated and each provided with a plurality of blades formed of two members, one of which stands at an inclination to the chains and the other is adjustable to vary the inclination of the first.

Signed by me at Copenhagen, Denmark this 30th day of July 1909.

RASMUS PEDER NIELSEN.

Witnesses:
IRISTAN WALSING,
KARL MADSEN.